US008024616B2

(12) United States Patent
Mejdrich et al.

(10) Patent No.: US 8,024,616 B2
(45) Date of Patent: Sep. 20, 2011

(54) PSEUDO RANDOM PROCESS STATE REGISTER FOR FAST RANDOM PROCESS TEST GENERATION

(75) Inventors: Eric O. Mejdrich, Rochester, MN (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 12/359,570

(22) Filed: Jan. 26, 2009

(65) Prior Publication Data

US 2010/0192014 A1 Jul. 29, 2010

(51) Int. Cl.
G06F 11/00 (2006.01)

(52) U.S. Cl. ...................................... 714/38.1; 717/124
(58) Field of Classification Search .................. None
See application file for complete search history.

(56) References Cited

U.S. PATENT DOCUMENTS

| 6,807,646 B1* | 10/2004 | Williams et al. .............. 714/736 |
| 2005/0129247 A1* | 6/2005 | Gammel et al. .............. 380/286 |
| 2007/0214398 A1* | 9/2007 | Zhang et al. .................. 714/728 |
| 2009/0222696 A1* | 9/2009 | Duale ............................. 714/32 |

* cited by examiner

*Primary Examiner* — Christopher S McCarthy
(74) *Attorney, Agent, or Firm* — James E. Boice

(57) ABSTRACT

A method, system and computer program product are presented for providing pseudo-random input test data to a test program. A seed value is generated and stored in a seed register. Using the seed value as an input, a pseudo-random input test value is generated by a Linear Feedback Shift Register (LFSR), and stored in a GPR within a processor core. Using the pseudo-random input test value from the GPR, a test program is executed within the processor core.

20 Claims, 5 Drawing Sheets

US 8,024,616 B2

PSEUDO RANDOM PROCESS STATE REGISTER FOR FAST RANDOM PROCESS TEST GENERATION

BACKGROUND OF THE INVENTION

1. Technical Field

The present disclosure relates to the field of computers, and specifically to computer test programs running on computers. Still more particularly, the present disclosure relates to test programs that utilize randomly generated numbers.

2. Description of the Related Art

Many test programs require an element of randomness in input test data, in order to avoid tests that have predictable results. That is, if expected data is tested, then expected results may occur. In order to provide random input test data, many systems utilize a random number generator or some other type of random input source. There are two main problems with such systems. First, generating such input data using a random number generator requires the use of much of a computer's processing resources. Second, such systems are usually irreversible, in that there is no way to backtrack through a test to reach a known random input test data.

SUMMARY OF THE INVENTION

To address the issues described above, a method, system and computer program product are presented for providing pseudo-random input test data to a test program. A seed value is generated and stored in a seed register. Using the seed value as an input, a pseudo-random input test value is generated by a Linear Feedback Shift Register (LFSR), and stored in a GPR within a processor core. Using the pseudo-random input test value from the GPR, a test program is executed within the processor core.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
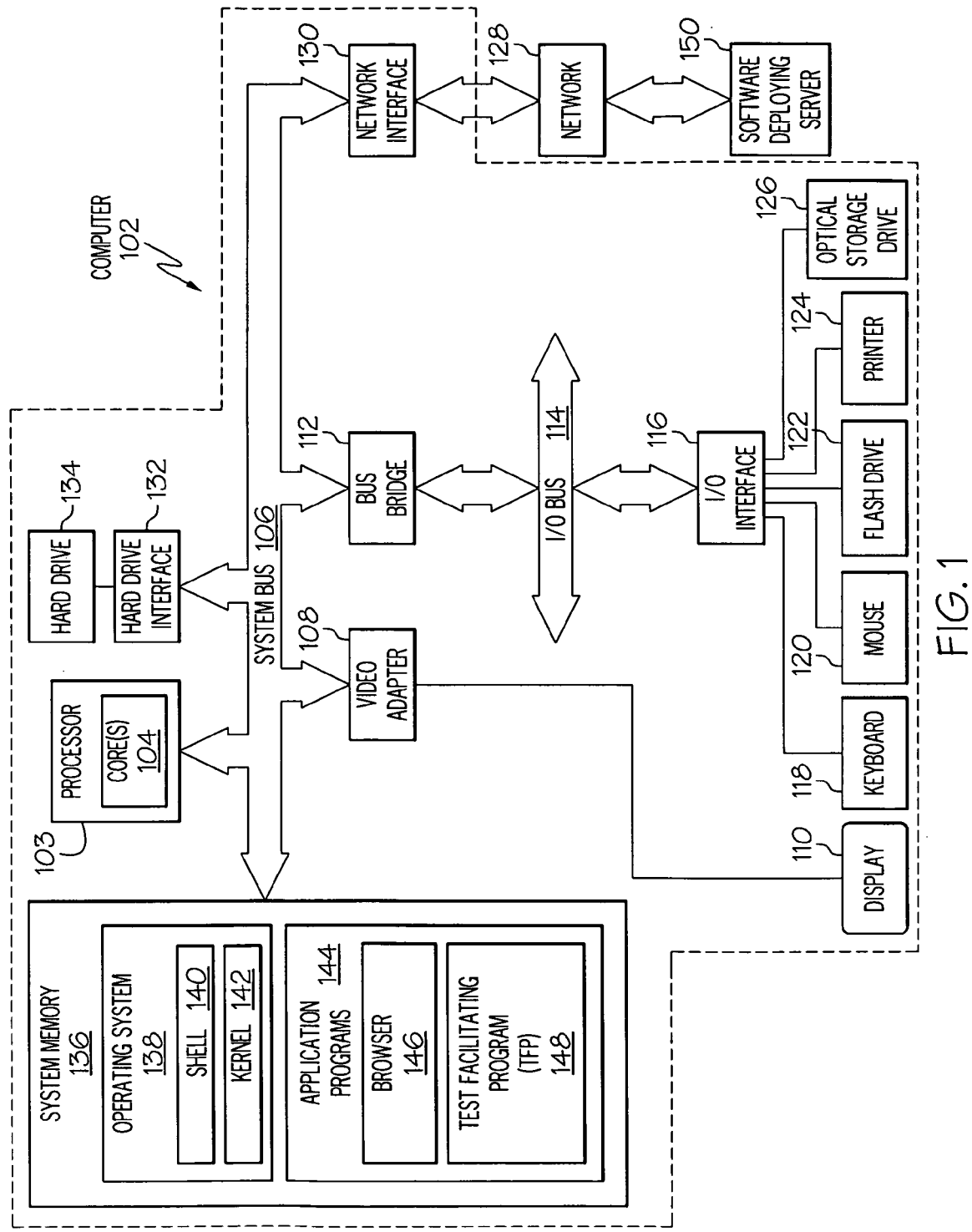
FIG. 1 depicts an exemplary computer which may be utilized by the present invention.

With reference now to FIG. 1, there is depicted a block diagram of an exemplary computer 102, which the present invention may utilize. Note that some or all of the exemplary architecture shown for computer 102 may be utilized by software deploying server 150.

Computer 102 includes a processor 103, which may utilize one or more processors each having one or more processor cores 104. Processor 103 is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Flash Drive 122, a printer 124, and an optical storage device 126 (e.g., a CD or DVD drive). The format of the ports connected to I/O interface 116 may be any known to those skilled in the art of computer architecture, including but not limited to Universal Serial Bus (USB) ports.

Computer 102 is able to communicate with a software deploying server 150 via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Test Facilitating Program (TFP) 148. TFP 148 includes a code for implementing the processes described below in FIGS. 2-5. In one embodiment, computer 102 is able to download TFP 148 from software deploying server 150, including in an on-demand basis. Note further that, in one embodiment of the present invention, software deploying server 150 performs all of the functions associated with the present invention (including execution of TFP 148), thus freeing computer 102 from having to use its own internal computing resources to execute TFP 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
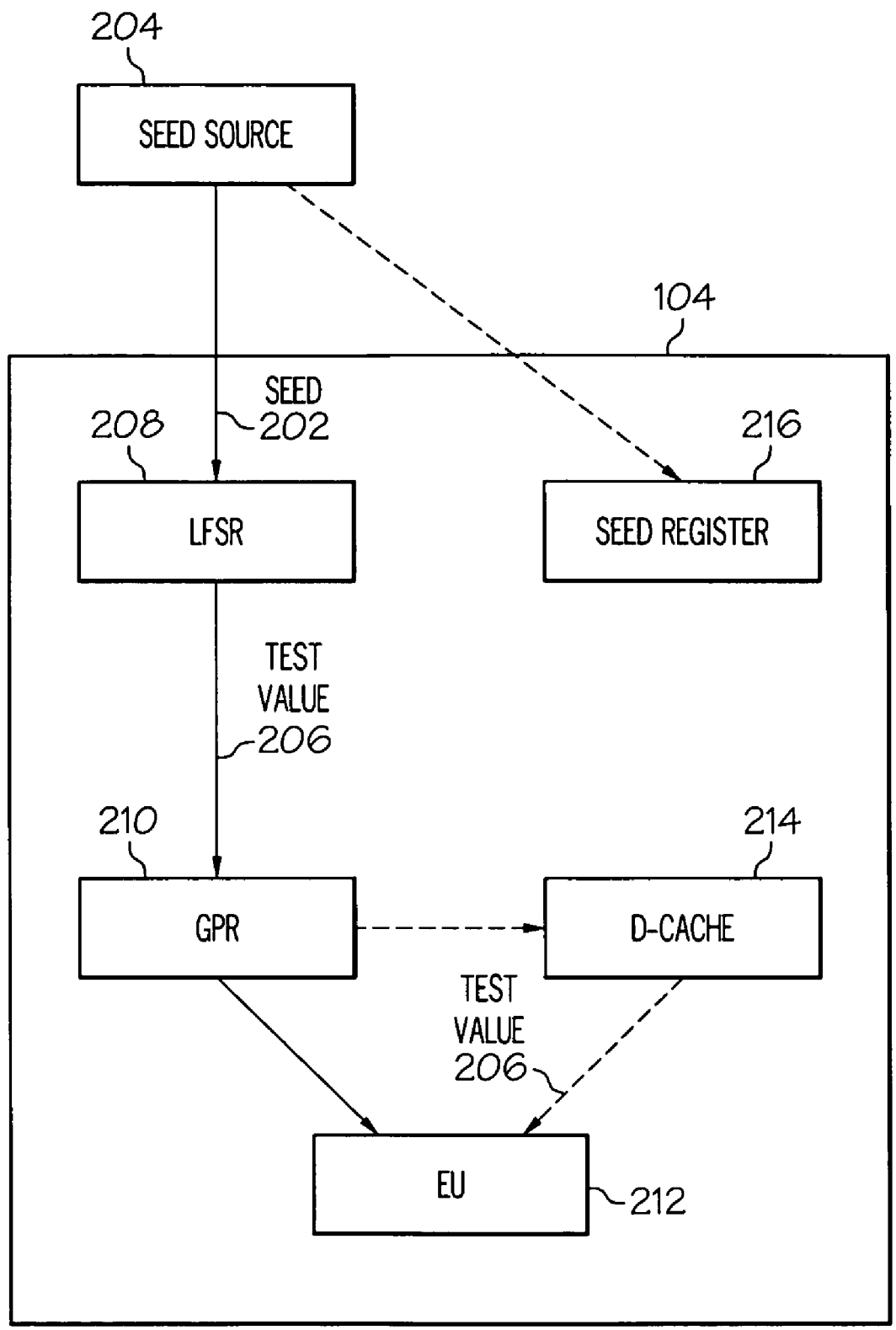
FIG. 2 illustrates additional detail of a processor core used in the computer depicted in FIG. 1.

With reference now to FIG. 2, additional detail of a processor core 104 (introduced in FIG. 1) in accordance with the present invention is presented. Processor core 104 is able to receive a seed 202 from a seed source 204. As will be described in further detail below, seed 202 is a precursor operand for generating a pseudo-random test value 206 by a Logical Feedback Shift Register (LFSR) 208 (or other logic that is capable of generating a random/pseudo-random test value 206 from a seed 202). Note that the test value 206 is defined as being pseudo-random in that it has a different and non-predictable value every time it is updated at a new clock cycle, but that the pattern of such changes to the test value 206 remains fixed. Note also that the test value 206 can be replicated and back-traced using the original seed 202 in a manner described below.

Note that the seed source 204 is depicted as being outside of the processor core 104, which would be the case if the seed source 204 were a Random Number Generator (RNG), a real-time date/time stamp, or any other external random or semi-random data producer. Alternatively, seed source 204 may be internal to the processor core 104, and may be a register, buffer, architecture state, counter or other hardware/software that is internal to the processor core 104.

As depicted in FIG. 2, the test value 206 is loaded into a General Purpose Register (GPR) 210, from which it is loaded into an Execution Unit (EU) 212 for executing a test program that needs a random operand as an input. Note that in one embodiment the GPR is first stored in a Data Cache (D-Cache) 214 before being loaded into the EU 212 (as depicted and described in further detail below in FIG. 4).

Figure 3:
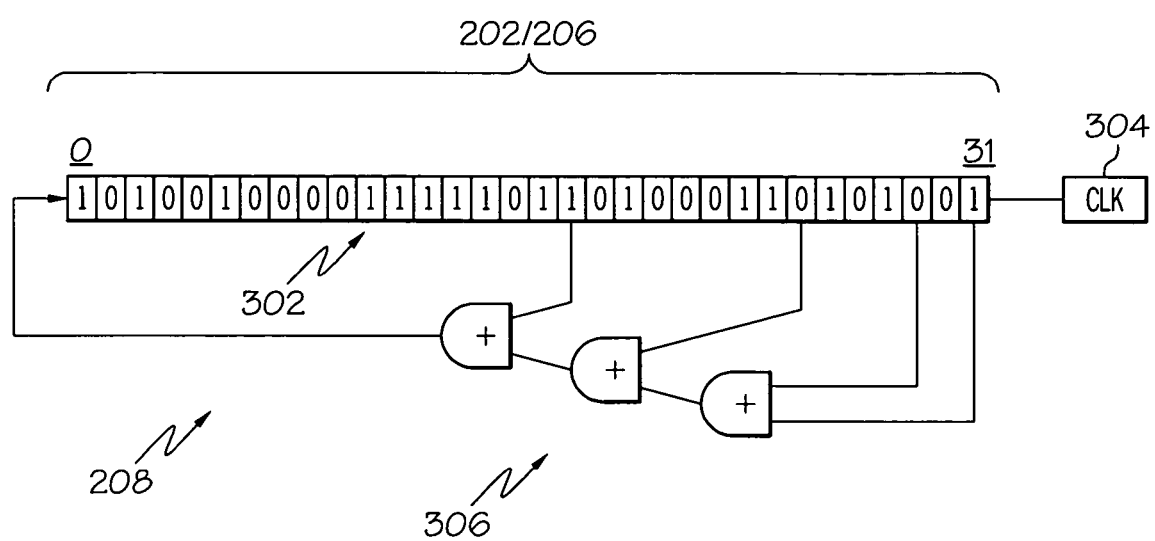
FIG. 3 depicts an exemplary Linear Feedback Shift Register (LFSR) that may be used by process and system described in the present invention.

With reference now to FIG. 3, additional detail of the LFSR 208 is presented. Note that seed 202 is initially loaded into a register component 302 of the LFSR 208. A clock signal from a clock 304 causes values in the register component 302 to shift to the right every clock cycle, resulting in the 31 bit to be discarded and the 0 bit to be replaced with a 0 or 1, depending on the input signals going to the logic gates 306. This shifting generates the test value 206 shown in FIG. 2, which is the content of the register component 302 after being shifted, and can change with every clock cycle. The content of the register component 302 can then be loaded directly into the GPR 210 shown in FIG. 2 for use by the EU 212, and/or can be loaded into an intermediate D-Cache 214.

While the logic gates 306 are shown as OR gates, other types of logic gates or a combination of different types of logic gates such as inverters, AND gates, NOR gates, and/or NAND gates can be used by LFSR 208 to shift the contents of the register component 302. Similarly, LFSR 208 may be replaced by a logic other than a shift register. That is, any type of logic that can convert a first value into a second value in a reproducible and predictable manner can be used.

Besides being pseudo-random (as described above), test value 206 can be replicated to any point in time (i.e., to any clock cycle) using a same original seed 202. For example, consider a scenario in which a tracer determines that an error in a test program occurred using a test value 206 that was generated during a $20^{th}$ clock cycle after the test program began. By loading the seed 202 back into the register component 302, and running the LFSR 208 for 20 clock cycles, the exact test value 206 that caused the error can be replicated. In order to have access to the original seed 202 shown in FIG. 2, original seed 202 is stored in a seed register 216 (e.g., Special Purpose Register—SPR 457 shown below in FIG. 4) in the processor core 104 when originally loaded into the register component 302.

Figure 4:
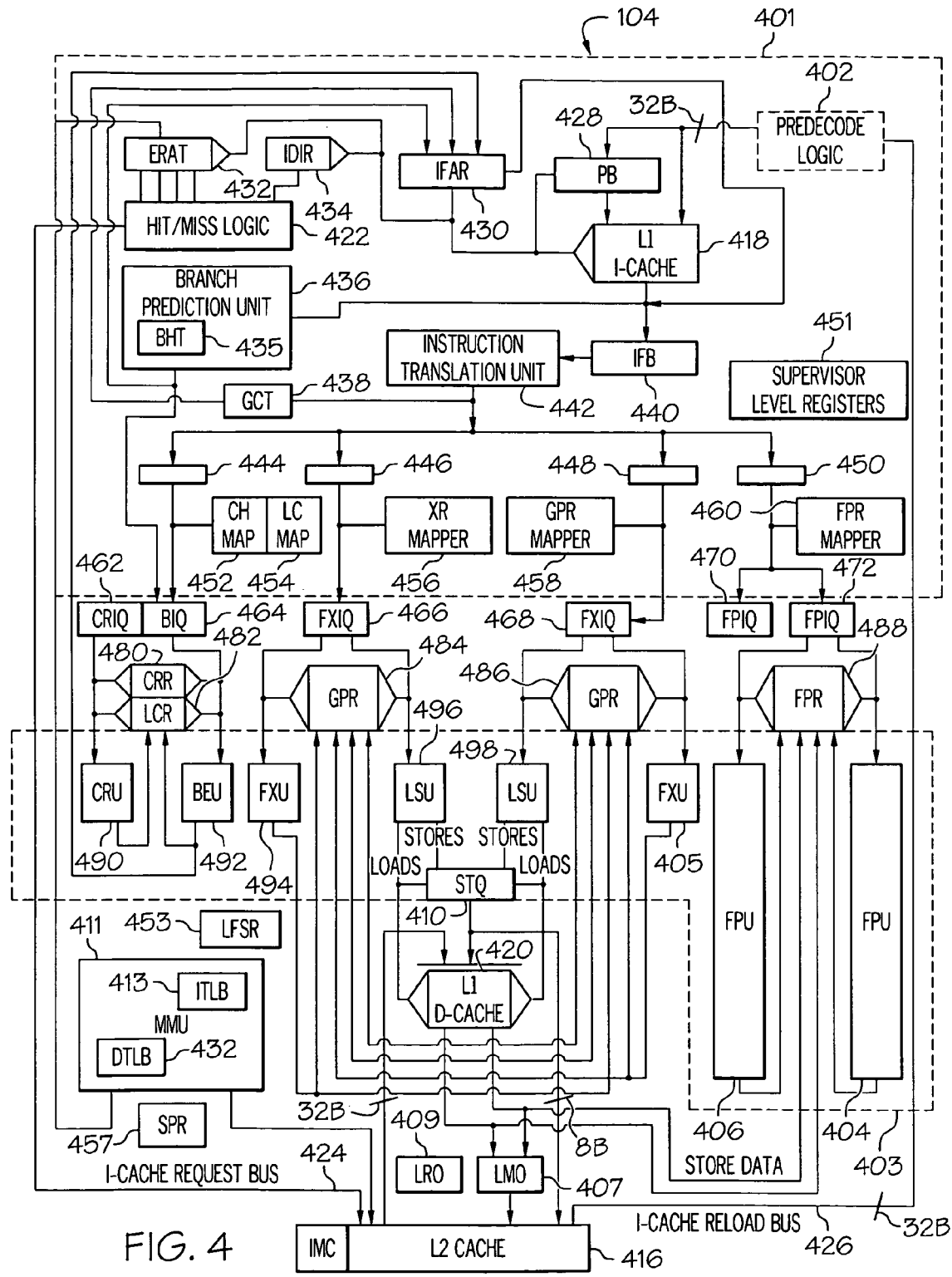
FIG. 4 illustrates additional detail of the processor core depicted in FIG. 2.

Referring now to FIG. 4, additional exemplary detail of core 104, originally presented in FIGS. 1-2, is presented. Core 104 includes an on-chip multi-level cache hierarchy including a unified level two (L2) cache 416 and bifurcated level one (L1) instruction (I) and data (D) caches 418 and 420, respectively. As is well-known to those skilled in the art, caches 416, 418 and 420 provide low latency access to cache lines corresponding to memory locations in system memories (e.g., system memory 136 shown in FIG. 1).

Instructions are fetched for processing from L1 I-cache 418 in response to the effective address (EA) residing in instruction fetch address register (IFAR) 430. During each cycle, a new instruction fetch address may be loaded into IFAR 430 from one of three sources: branch prediction unit (BPU) 436, which provides speculative target path and sequential addresses resulting from the prediction of conditional branch instructions, global completion table (GCT) 438, which provides flush and interrupt addresses, and branch execution unit (BEU) 492, which provides non-speculative addresses resulting from the resolution of predicted conditional branch instructions. Associated with BPU 436 is a branch history table (BHT) 435, in which are recorded the resolutions of conditional branch instructions to aid in the prediction of future branch instructions.

An effective address (EA), such as the instruction fetch address within IFAR 430, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 104, effective-to-real address translation is performed by memory management units (MMUs) and associated address translation facilities. Preferably, a separate MMU is provided for instruction accesses and data accesses. In FIG. 4, a single MMU 411 is illustrated, for purposes of clarity, showing connections only to Instruction Store Unit (ISU) 401. However, it is understood by those skilled in the art that MMU 411 also preferably includes connections (not shown) to load/store units (LSUs) 496 and 498 and other components necessary for managing memory accesses. MMU 411 includes Data Translation Lookaside Buffer (DTLB) 412 and Instruction Translation Lookaside Buffer (ITLB) 413. Each TLB contains recently referenced page table entries, which are accessed to translate EAs to RAs for data (DTLB 412) or instructions (ITLB 413). Recently referenced EA-to-RA translations from ITLB 413 are cached in EOP effective-to-real address table (ERAT) 432.

If hit/miss logic 422 determines, after translation of the EA contained in IFAR 430 by ERAT 432 and lookup of the real address (RA) in I-cache directory 434, that the cache line of instructions corresponding to the EA in IFAR 430 does not reside in L1 I-cache 418, then hit/miss logic 422 provides the RA to L2 cache 416 as a request address via I-cache request bus 424. Such request addresses may also be generated by prefetch logic within L2 cache 416 based upon recent access patterns. In response to a request address, L2 cache 416 outputs a cache line of instructions, which are loaded into prefetch buffer (PB) 428 and L1 I-cache 418 via I-cache reload bus 426, possibly after passing through optional pre-decode logic 402.

Once the cache line specified by the EA in IFAR 430 resides in L1 I-cache 418, L1 I-cache 418 outputs the cache line to both branch prediction unit (BPU) 436 and to instruction fetch buffer (IFB) 440. BPU 436 scans the cache line of instructions for branch instructions and predicts the outcome of conditional branch instructions, if any. Following a branch prediction, BPU 436 furnishes a speculative instruction fetch address to IFAR 430, as discussed above, and passes the prediction to branch instruction queue 464 so that the accuracy of the prediction can be determined when the conditional branch instruction is subsequently resolved by branch execution unit 492.

IFB 440 temporarily buffers the cache line of instructions received from L1 I-cache 418 until the cache line of instructions can be translated by instruction translation unit (ITU) 442. In the illustrated embodiment of core 104, ITU 442 translates instructions from user instruction set architecture (UISA) instructions into a possibly different number of internal ISA (IISA) instructions that are directly executable by the execution units of core 104. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 438 to an instruction group, the members of which are permitted to be dispatched and executed out-of-order with respect to one another. Global completion table 438 tracks each instruction group for which execution has yet to be completed by at least one associated EA, which is preferably the EA of the oldest instruction in the instruction group.

Following UISA-to-IISA instruction translation, instructions are dispatched to one of latches 444, 446, 448 and 450, possibly out-of-order, based upon instruction type. That is, branch instructions and other condition register (CR) modifying instructions are dispatched to latch 444, fixed-point and load-store instructions are dispatched to either of latches 446 and 448, and floating-point instructions are dispatched to latch 450. Each instruction requiring a rename register for temporarily storing execution results is then assigned one or more rename registers by the appropriate one of CR mapper 452, link and count (LC) register mapper 454, exception register (XER) mapper 456, general-purpose register (GPR) mapper 458, and floating-point register (FPR) mapper 460.

The dispatched instructions are then temporarily placed in an appropriate one of CR issue queue (CRIQ) 462, branch issue queue (BIQ) 464, fixed-point issue queues (FXIQs) 466 and 468, and floating-point issue queues (FPIQs) 470 and 472. From issue queues 462, 464, 466, 468, 470 and 472, instructions can be issued opportunistically to the execution units of processor 103 (shown in FIG. 1) for execution as long as data dependencies and antidependencies are observed. The instructions, however, are maintained in issue queues 462-472 until execution of the instructions is complete and the result data, if any, are written back, in case any of the instructions need to be reissued.

As illustrated, the execution units of core 104 include a CR unit (CRU) 490 for executing CR-modifying instructions, a branch execution unit (BEU) 492 for executing branch instructions, two fixed-point units (FXUs) 494 and 405 for executing fixed-point instructions, two load-store units (LSUs) 496 and 498 for executing load and store instructions, and two floating-point units (FPUs) 406 and 404 for executing floating-point instructions. Each of execution units 490-404 is preferably implemented as an execution pipeline having a number of pipeline stages.

During execution within one of execution units 490-404, an instruction receives operands, if any, from one or more architected and/or rename registers within a register file coupled to the execution unit. When executing CR-modifying or CR-dependent instructions, CRU 490 and BEU 492 access the CR register file 480, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 482 contains a count register (CTR), a link register (LR) and rename registers of each, by which BEU 492 may also resolve conditional branches to obtain a path address. General-purpose register files (GPRs) 484 and 486, which are synchronized, duplicate register files, and store fixed-point and integer values accessed and produced by FXUs 494 and 405 and LSUs 496 and 498. As noted above, GPRs 484 and 486 can also be used as the GPR 210 introduced in FIG. 2 for storing a test value 206 that has been generated by a LFSR 453 (208 in FIG. 2). Note that in one embodiment, LFSR 453 is actually an internal component that is within one of the execution units (e.g., 494, 406, 404), thus providing immediate access to the test values 206 stored in the LFSR 453. Note also that a Special Purpose Register (SPR) 457 (functioning as the seed register 216 shown in FIG. 2) can be used to store the seed 202 described in FIG. 2. Since SPR 457 contains data describing current process state in core 104, SPR 457 is an exemplary architecture state register similar to the architecture state registers CRR 480, LCR 482, GPRs 484 and 486, FPR 488, supervisor level registers 451, L-1 I-cache 418, L-1 D-cache 420, address translation information such as DTLB 413 and ITLB 415, BHT 435 and all or part of the content of L2 cache 416 as described below in the discussion of hard and soft architecture states.

Note that since the SPR 457 contains the seed 202 described in FIG. 2, there is no need to go out to a memory interface to retrieve the seed 202 from some external source. A major benefit derived from this approach over an external random number generator is due to a special interface (not shown) between the SPR 457 and the execution units that utilize the seed value. This special interface may be a slow SPR bus (not shown), which couples the SPR 457 to the L-1 D-cache 420 and other processing components (e.g., FPU 406, ERAT 432, etc.) in the processor that read the random number value stored in the SPR 457 to produce a reliable, accurate, and reproducible cycle by cycle result. If the processor 401 had to go out on a memory interface (e.g., using system bus 106 shown in FIG. 1), then the result would not be reproducible due to unpredictable retrieval times, timing issues, and random number generation irregularities. Using the present process and the SPR 457, however, there is cycle accurate reproducibility that results from not having to utilize an external memory interface.

Note also that floating-point register file (FPR) 488, which like GPRs 484 and 486 may also be implemented as duplicate sets of synchronized registers, contains floating-point values that result from the execution of floating-point instructions by FPUs 406 and 404 and floating-point load instructions by LSUs 496 and 498.

After an execution unit finishes execution of an instruction, the execution notifies GCT 438, which schedules completion of instructions in program order. To complete an instruction executed by one of CRU 490, FXUs 494 and 405 or FPUs 406 and 404, GCT 438 signals the execution unit, which writes back the result data, if any, from the assigned rename register(s) to one or more architected registers within the appropriate register file. The instruction is then removed from the issue queue and once all instructions within its instruction group have been completed, it is removed from GCT 438. Other types of instructions, however, are completed differently.

When BEU 492 resolves a conditional branch instruction and determines the path address of the execution path that should be taken, the path address is compared against the speculative path address predicted by BPU 436. If the path addresses match, no further processing is required. If, however, the calculated path address does not match the predicted path address, BEU 492 supplies the correct path address to IFAR 430. In either event, the branch instruction can then be removed from BIQ 464, and when all other instructions within the same instruction group have completed executing, from GCT 438.

Following execution of a load instruction, the effective address computed by executing the load instruction is translated to a real address by a data ERAT (not illustrated) and then provided to L1 D-cache 420 as a request address. At this point, the load instruction is removed from FXIQ 466 or 468 and placed in load reorder queue (LRQ) 409 until the indicated load is performed. If the request address misses in L1 D-cache 420, the request address is placed in load miss queue (LMQ) 407, from which the requested data is retrieved from L2 cache 416, and failing that, from another core 104 or from system memory. LRQ 409 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 410 into which effective addresses for stores are loaded following execution of the store instructions. From STQ 410, data can be stored into either or both of L1 D-cache 420 and L2 cache 416.

Note that the state of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In core 104 of FIG. 4, the hard state includes the contents of user-level registers, such as CRR 480, LCR 482, GPRs 484 and 486, FPR 488, as well as supervisor level registers 451. The soft state of core 104 includes both "performance-critical" information, such as the contents of L-1 I-cache 418, L-1 D-cache 420, address translation information such as DTLB 413 and ITLB 415, and less critical information, such as BHT 435 and all or part of the content of L2 cache 416. Thus, the content of such registers are fixed values that describe a real-time current architecture state register of the processor core 104.

Figure 5:
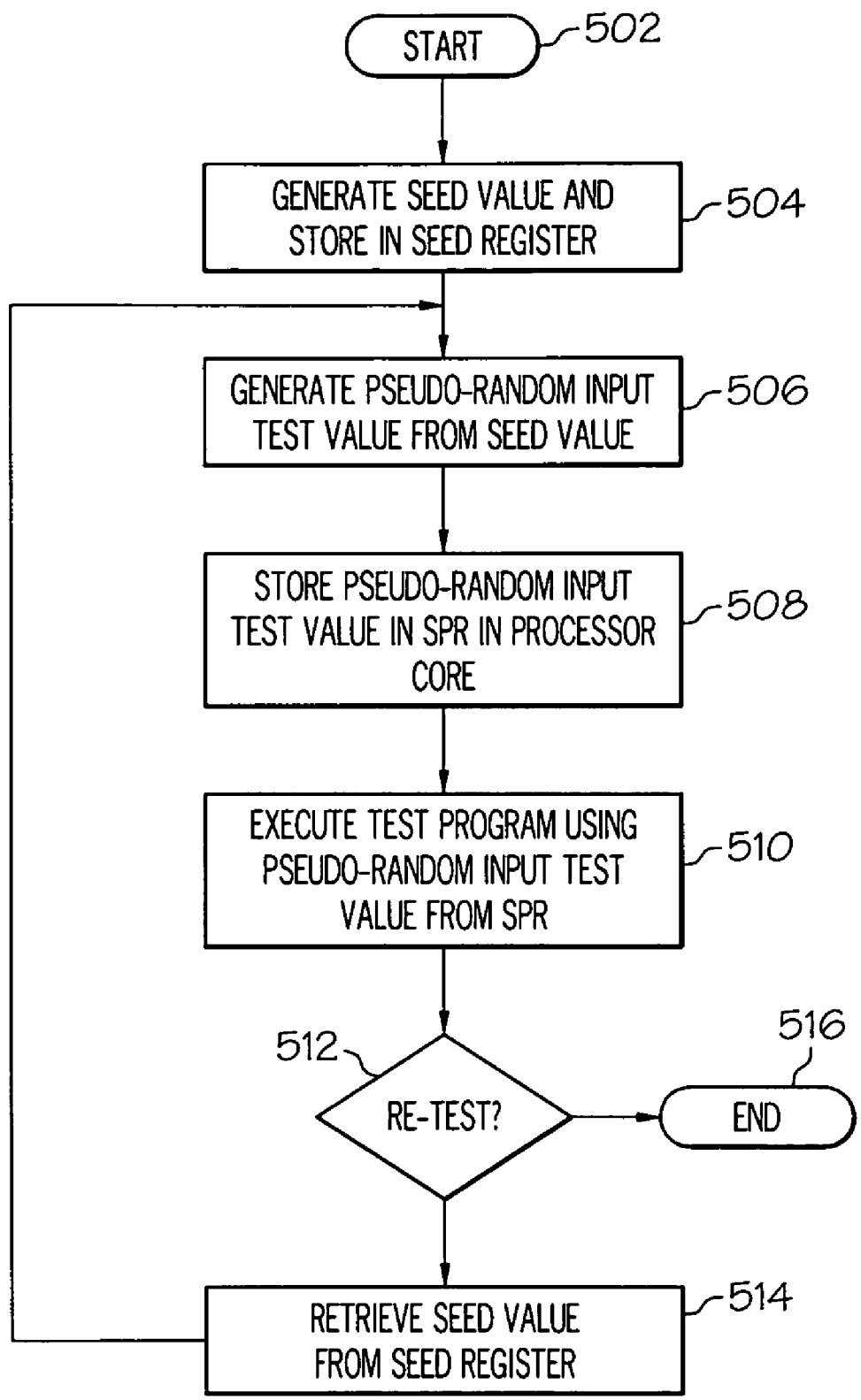
FIG. 5 is a high-level flow chart of exemplary steps taken to generate and locally store pseudo-random test data for use as inputs to a test program.

With reference now to FIG. 5, a high level flow chart of exemplary steps taken to provide random input test data to a test program is presented. After initiator block 502, which may be prompted by a decision to run a test program on a computer system, a seed value is generated and stored in a seed register (block 504). This seed value may be generated by a random number generator, may be a fixed value that is stored in a test program, may be a fixed value that is stored in an architecture state register in the processor core, etc. Using this stored seed value, a pseudo-random input test value is generated (block 506) and stored (block 508) in a Special Purpose Register (e.g., SPR 457 shown in FIG. 4) in the processor core. As described above with the LSFR 208 shown in FIGS. 2-3, a new pseudo-random input test value can be generated at every clock cycle.

Using the pseudo-random input test value as an input operand, a test program is run (block 510). This test program may test a computer, processor, core, or any hardware and/or software logic. The pseudo-random input test value is constructed to provide a stimulus for a response from the tested logic using the test program.

Note that in one embodiment of the present invention, the test program that utilizes the test value described above is run by a kernel in an operating system, thus making the test program inaccessible to a user mode, and thus making the integrity of the test program and the process used to generate the test value more secure.

A determination may be made that a re-test is needed (query block 512). This determination may be based on the tested logic failing, an error code being generated by the test program, or simply a desire to re-confirm that the tested logic will repeatedly and consistently pass the test. If so, then the stored seed is retrieved from the seed register (block 514) in order to create a coherent re-test by re-executing the steps describe in block 506-510. Otherwise, the process ends (terminator block 516).

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method of providing random input test data to a test program, the computer-implemented method comprising:
   generating a seed value;
   storing the seed value in a Special Purpose Register (SPR) that functions as a seed register;
   generating a pseudo-random input test value from the seed value;
   storing the pseudo-random input test value in a General Purpose Register (GPR) within a processor core;
   executing a test program using the pseudo-random input test value as a test input; and
   in response to determining that a retest of the test program is required, retrieving the seed value from the SPR to regenerate the pseudo-random input test value for another execution of the test program, wherein the seed value is retrieved without accessing an external memory interface.

2. The computer-implemented method of claim 1, wherein the pseudo-random input test value is generated by a Linear Feedback Shift Register (LFSR).

3. The computer-implemented method of claim 2, wherein the processor core utilizes an internal clock that generates clock cycles, and wherein a new pseudo-random input test value is generated by the LFSR every clock cycle.

4. The computer-implemented method of claim 3, wherein the processor core comprises an execution unit that executes the test program, and wherein the LFSR is within the execution unit that executes the test program.

5. The computer-implemented method of claim 1, wherein the seed value is generated by a random number generator.

6. The computer-implemented method of claim 1, wherein the seed value is a fixed value that is stored in an architecture state register in the processor core.

7. The computer-implemented method of claim 1, wherein the test program is run by a kernel in an operating system used by the processor core, wherein the test program is inaccessible to a user mode.

8. A system comprising:
   a seed generator for generating a seed value;
   a Special Purpose Register (SPR) that functions as a seed register for storing the seed value;
   a random input test value generator for generating a random input test value from the seed value;
   a processor core; and
   a General Purpose Register (GPR) within the processor core, wherein the GPR stores the random input test value, and wherein the processor core executes a test program using the random input test value as a test input, and wherein the processor core, in response to determining that a retest of the test program is required, retrieves the seed value from the seed register to regenerate the random input test value for another execution of the test program.

9. The system of claim 8, further comprising:
   a Linear Feedback Shift Register (LFSR) for generating the random input test value.

10. The system of claim 9, further comprising:
    an internal clock within the processor core, wherein the internal clock generates clock cycles, and wherein a new random input test value is generated by the LFSR every clock cycle.

11. The system of claim 10, wherein the processor core further comprises:
    an execution unit that executes the test program, wherein the LFSR is within the execution unit that executes the test program.

12. The system of claim 8, wherein the seed value is generated by a random number generator.

13. The system of claim 8, wherein the seed value is a fixed value that is stored in the test program.

14. A non-transitory computer-readable storage medium on which is encoded a computer program, the computer program comprising computer executable instructions configured for: generating a seed value; storing the seed value in a seed register; generating a random input test value from the seed value; storing the random input test value in a General Purpose Register (GPR) within a processor core; executing a test program using the random input test value as a test input; and in response to determining that a retest of the test program is required, retrieving the seed value from the seed register to regenerate the random input test value for another execution of the test program.

15. The computer-readable storage medium of claim 14, wherein the random input test value is generated by a Linear Feedback Shift Register (LFSR).

16. The computer-readable storage medium of claim 15, wherein the processor core utilizes an internal clock that generates clock cycles, and wherein a new random input test value is generated by the LFSR every clock cycle.

17. The computer-readable storage medium of claim 16, wherein the processor core comprises an execution unit that executes the test program, and wherein the LFSR is within the execution unit that executes the test program.

18. The computer-readable storage medium of claim 14, wherein the seed value is generated by a random number generator.

19. The computer-readable storage medium of claim 14, wherein the test program is run by a kernel in an operating system used by the processor core, wherein the test program is inaccessible to a user mode.

20. The computer-readable storage medium of claim 14, wherein the computer executable instructions are deployed to the processor core from a service provider server in an on-demand basis.

* * * * *